(12) United States Patent
Cao et al.

(10) Patent No.: US 11,403,213 B2
(45) Date of Patent: Aug. 2, 2022

(54) REDUCING FRAGMENTATION OF COMPUTER MEMORY

(71) Applicant: INTERNATIONAL BUSINESS MACHINES CORPORATION, Armonk, NY (US)

(72) Inventors: Wenqi Cao, Yorktown Heights, NY (US); Arun Iyengar, Yorktown Heights, NY (US); Gong Su, Yorktown Heights, NY (US); Zehra Sura, Yorktown Heights, NY (US); Qi Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 16/457,373

(22) Filed: Jun. 28, 2019

(65) Prior Publication Data

US 2020/0409833 A1 Dec. 31, 2020

(51) Int. Cl.
| | |
|---|---|
| *G06F 12/00* | (2006.01) |
| *G06F 12/02* | (2006.01) |
| *G06F 8/41* | (2018.01) |
| *G06F 9/30* | (2018.01) |
| *G06F 12/1009* | (2016.01) |

(52) U.S. Cl.
CPC ........... *G06F 12/0238* (2013.01); *G06F 8/41* (2013.01); *G06F 9/30087* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 9,483,400 B2 | 11/2016 | McKinley | |
| 2005/0132249 A1* | 6/2005 | Burton | G06F 11/2097 714/5.11 |
| 2009/0276602 A1* | 11/2009 | Chedru | G06F 12/023 711/171 |

OTHER PUBLICATIONS

Rachata Ausavarungnirun et al., "Mosaic: Enabling Application—Transparent Support for Multiple Page Sizes in Throughput Processors," 50th Annual IEEE/ACM International Symposium on Microarchitecture, (Oct. 14-18), ACM 2017 https://doi.org/10.1145/3123939-3123975.

(Continued)

*Primary Examiner* — Midys Rojas
(74) *Attorney, Agent, or Firm* — F. Chau & Associates, LLC (57) ABSTRACT

A method for transparently moving a block of memory with respect to an application using the block of memory, includes inserting, by a compiler, in an application that includes a memory allocation call, instructions for transparently moving a block of memory with respect to an application using the block of memory. The instructions include obtaining a first pointer returned by a memory allocator, where the first pointer points to an internal data structure, the internal data structure includes a read-write lock and a second pointer, and the second pointer points to an actual memory block. The instructions further include acquiring a read lock on a read-write lock in the internal data structure, before the first pointer is used by the application, obtaining the second pointer to the actual memory block, and dereferencing the second pointer to access the actual memory block for the application data.

25 Claims, 7 Drawing Sheets

(56) References Cited

OTHER PUBLICATIONS

Youngjin Kwon et al., "Coordinated and Efficient Huge Page Management with Ingens," 12th USENIX Symposium on Operating Systems Design and Implementation (OSDI '16), Nov. 2-4, 2016.

* cited by examiner

REDUCING FRAGMENTATION OF COMPUTER MEMORY

BACKGROUND

Technical Field

Embodiments of the disclosure are directed to memory management, and in particular, to reducing fragmentation of computer memory.

Discussion of the Related Art

Embodiments of the present disclosure are directed to reducing fragmentation of computer memory, in particular to reducing fragmentation for large pages. Embodiments of the disclosure are also directed to reducing fragmentation outside the domain of large pages.

As the price of DRAM memory decreases and demand for large memory capacity from memory intensive applications such as in-memory key-value store and NoSQL databases increases, more and more systems are now equipped with a large amount of memory, typically on the order of several hundreds of gigabytes or even terabytes.

With such a large memory capacity, traditional use of 4 KB page sizes puts stress on the virtual memory subsystem of the operating system (OS), because the large number of 4 KB pages required overwhelms the capacity of the translation lookaside buffer (TLB). As a result, increased TLB misses incur high virtual address translation overhead and degrade system performance. The situation is worse in a virtualized environment since both the guest and the host must perform virtual address translation.

Using a larger page size is an obvious and effective solution for the situation. In fact, modern CPUs, such as Intel x86, IBM Power and S390, etc., and OSs, such as Linux, Mac OS, etc., have supported larger, platform dependent page sizes for quite some time now. In addition, research have shown that by simply enabling larger page sizes, typically called huge pages, some memory intensive applications such as MongoDB can see as much as 37% performance improvement.

Despite its effectiveness, adoption of huge pages as the default system page size, has been slow. The main reason is application memory bloat due to fragmentation when using huge pages. There are two types of fragmentation: external and internal. The 2 MB huge page size on Intel x86 is used below as an example to illustrate the two types of fragmentation.

External fragmentation refers to the situation where 512 consecutive 4 KB pages cannot be found to map a 2 MB page. As a result, even though the system might have plenty of free memory regions, all of them are smaller than 2 MB so 2 MB pages cannot be used to map them. Note that external fragmentation only exists when there are a mixture of different page sizes.

Internal fragmentation refers to the situation when the memory space within a page cannot be used by another application once the page is given to a first application, despite the fact that the first application might be using just one byte in the page. This is the natural side effect of using fix-sized pages as the smallest allocation unit. Note that internal fragmentation applies to both 4 KB and 2 MB pages, however, the 2 MB pages make the situation 512 times worse.

There are existing ways to deal with both types of fragmentation. For external fragmentation, the typical solution is to move around the 4 KB pages to create 512 consecutive 4 KB pages so that they can be mapped with one single 2 MB page. For internal fragmentation, the typical solution is to break the 2 MB page down into 512 4 KB pages, and recycle those unused 4 KB pages to other applications.

The internal fragmentation situation is fundamentally unsolved, because the solution simply goes back to the original 4 KB pages, which defeats the purpose and loses the benefits of using 2 MB pages in the first place.

SUMMARY

Exemplary embodiments of the present disclosure are directed to methods for solving internal fragmentation without falling back to 4 KB pages. According to embodiments of the disclosure, the return of an indirect pointer to a memory chunk is combined with synchronizing application threads and memory allocator using a read-write lock to allow memory chunks to be freely moved around. Therefore, normal memory compaction using any existing algorithm can be performed by the memory allocator to reduce internal fragmentation. Embodiments of the disclosure use compiler support to automatically generate additional application code to dereference the indirect pointer and to acquire/release the read-write lock, thus requiring no application change.

According to an embodiment of the disclosure, there is provided a method for transparently moving a block of memory with respect to an application using the block of memory, including inserting, by a compiler, in an application that includes a memory allocation call, computer code that includes instructions for transparently moving a block of memory with respect to an application using the block of memory. The instructions comprise the steps of obtaining a first pointer returned by a memory allocator to an application, wherein the first pointer points to an internal data structure, wherein the internal data structure includes a read-write lock and a second pointer, wherein the second pointer points to an actual memory block for the application data, acquiring a read lock on a read-write lock in the internal data structure pointed to by the first pointer, before the first pointer is used by the application, obtaining the second pointer to the actual memory block for the application data, and dereferencing the second pointer to access the actual memory block for the application data.

According to a further embodiment of the disclosure, the method includes, when the application includes a memory free call, inserting, by the compiler, computer code that includes instructions for, after a last use of the first pointer by the application, releasing the read lock on the read-write lock in the internal data structure.

According to a further embodiment of the disclosure, the read lock on the read-write lock prevents the memory allocator from moving the memory block while the memory block is being accessed through the second pointer.

According to a further embodiment of the disclosure, the method includes, acquiring, by the memory allocator, a write lock on the read-write lock in the internal data structure, and transparently moving, by the memory allocator, the memory block pointed to by the second pointer with respect to the application.

According to a further embodiment of the disclosure, the method includes inserting in a memory allocator function that defragments memory, computer code that includes instructions for acquiring a write lock on the read-write lock associated with the memory block pointed to by the second pointer, and releasing said write lock after moving said memory block, wherein the acquiring instruction is inserted before an instruction that moves the memory block, and the releasing instruction is inserted after the instruction that moves the memory block.

According to a further embodiment of the disclosure, the instructions for obtaining a first pointer, acquiring a read lock, obtaining a second pointer, and dereferencing the second pointer are inserted between the memory allocation call and a first reference to the first pointer.

According to a further embodiment of the disclosure, the instructions that release the read lock are inserted between a last reference to the first pointer and the memory free call.

According to another embodiment of the disclosure, there is provided a method for reducing fragmentation in memory pages, including obtaining a first pointer returned by a memory allocator to an application, wherein the first pointer points to an internal data structure, wherein the internal data structure includes a read-write lock and a second pointer, wherein the second pointer points to an actual memory block for the application data, acquiring a read lock on a read-write lock in the internal data structure pointed to by the first pointer before the first pointer is used by the application, obtaining the second pointer to the actual memory block for the application data, and dereferencing the second pointer to access the actual memory block for the application data.

According to another embodiment of the disclosure, there is provided a method for selectively performing memory compaction in a computer, including allocating a plurality of memory blocks using a memory allocator that supports relocation, periodically monitoring the computer wherein a metric correlated with CPU or memory usage is determined, and performing a memory compaction based on comparing the metric with a first threshold by moving a memory block being used by at least one application.

According to a further embodiment of the disclosure, the metric comprises an average CPU usage over a time period, and performing a memory compaction based on comparing the metric with a first threshold comprises performing a memory compaction if the metric falls below the first threshold.

According to a further embodiment of the disclosure, the metric comprises one of a total amount of memory in use or a difference between a total amount of memory in use and a total amount of memory needed by at least one application, and performing a memory compaction based on comparing the metric with a first threshold comprises performing a memory compaction if the metric exceeds the first threshold.

According to a further embodiment of the disclosure, the metric comprises a largest free block size, and performing a memory compaction based on comparing the metric with a first threshold comprises performing a memory compaction if the metric falls below the first threshold.

According to a further embodiment of the disclosure, performing a memory compaction comprises copying a plurality memory blocks to a contiguous area of memory at one end of an address space.

According to a further embodiment of the disclosure, performing a memory compaction comprises copying a plurality memory blocks to a contiguous area of memory at one end of a page.

According to a further embodiment of the disclosure, allocating a plurality of memory blocks comprises inserting, by a compiler, in an application that includes a memory allocation call, computer code that obtains a first pointer returned by a memory allocator to an application, where the first pointer points to an internal data structure, the internal data structure contains a read-write lock and a second pointer, and the second pointer points to the actual memory block for the application data.

According to another embodiment of the disclosure, there is provided a method for allocating memory blocks in a computer, including providing a first memory allocator that supports relocation, determining a fraction of memory blocks to be allocated using the first memory allocator, periodically monitoring the computer wherein a metric correlated with memory usage is determined, and modifying the fraction of memory blocks to be allocated using the first memory allocator based on a value of the metric.

According to a further embodiment of the disclosure, the method includes providing a second memory allocator that does not support relocation, and allocating memory blocks using the first or second memory allocators.

According to a further embodiment of the disclosure, the fraction of memory blocks to be allocated using the first memory allocator is initialized to a default value.

According to a further embodiment of the disclosure, the fraction of memory blocks to be allocated using the first memory allocator is initialized based on an expected workload at a beginning of a computation.

According to a further embodiment of the disclosure, the metric comprises one of a total amount of memory in use or a difference between a total amount of memory in use and a total amount of memory needed by at least one application, and modifying the fraction of memory blocks to be allocated using the first memory allocator comprises at least one of increasing the fraction of memory blocks to be allocated using the first memory allocator in response to an increase of the metric, or decreasing the fraction of memory blocks to be allocated using the first memory allocator in response to a decrease of the metric.

According to a further embodiment of the disclosure, the metric comprises a largest free block size, and modifying the fraction of memory blocks to be allocated using the first memory allocator comprises at least one of increasing the fraction of memory blocks to be allocated using the first memory allocator in response to a decrease of the metric, or decreasing the fraction of memory blocks to be allocated using the first memory allocator in response to an increase of the metric.

According to a further embodiment of the disclosure, the method includes at least one of associating a memory block previously managed by the first memory allocator with the second memory allocator in response to a decrease in the fraction of memory blocks to be allocated using the first memory allocator, or associating a memory block previously managed by the second memory allocator with the first memory allocator in response to an increase in the fraction of memory blocks to be allocated using the first memory allocator.

According to a further embodiment of the disclosure, the method includes moving a first block to a same page as a second block based on an access frequency of the first block and an access frequency of the second block.

According to a further embodiment of the disclosure, the method includes moving a first block to a same page as a second block based on an access time of the first block and an access time of the second block.

According to another embodiment of the disclosure, there is provided a non-transitory program storage device readable by a computer, tangibly embodying a program of instructions executed by the computer to perform the method steps for transparently moving a block of memory with respect to an application using the block of memory.

DETAILED DESCRIPTION OF EXEMPLARY EMBODIMENTS

Exemplary embodiments of the disclosure as described herein generally provide methods for reducing fragmentation in large memory pages. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

In this disclosure, the term memory block and memory chunk are synonymous. A memory block or memory chunk may refer to a contiguous set of bits or bytes in a computer memory.

The issue with internal fragmentation lies in the fact that an in-use memory chunk cannot be moved around, i.e., copied from one page to another, because the application holds a direct pointer to the chunk. Thus, until the application calls free( ), there is nothing the memory allocator can do to that chunk. Note that this disclosure assumes a C/C++ type of runtime environment where the applications explicitly manage memory allocation through malloc( )/free( ) calls. Runtime environments such as Java JVM addresses this issue by forbidding pointers and garbage collecting unused objects, and are therefore outside the scope of embodiments of the disclosure.

To move an in-use memory chunk, one solution is that, instead of returning to the application a direct pointer p to the chunk, a pointer q is returned to the application that points to p, i.e., q=&p, using C/C++ notation. This way, the actual location of the chunk can be changed transparently to the application by modifying the value of p while keeping q constant during the lifetime of the chunk.

However, there are two challenges to making this work.

First, because q is not a direct pointer to the memory chunk, the application must dereference it once before it can be used to address memory contents. That is, instead of using p→foo, an application uses (*q)→foo. However, it would be impractical to require such a changes in all applications. Therefore, there should be a way to perform the (*q) dereference without any application change. Embodiments of the disclosure address this issue by employing compiler support. According to embodiments of the disclosure, the C/C++ compiler is augmented with the function of tracking the pointer q returned by malloc( ) and automatically generating the (*q) dereference code before the first time it is used.

Second, to move an in-use memory chunk to a different location for the purpose of defragmentation, the memory allocator must make sure that the application is not actively using the chunk during the move. Therefore, there is a race condition between the application and the memory allocator. More specifically, the application may be accessing the chunk by reading the content of p(=*q), while the memory allocator may be changing the location of the chunk by modifying the content of p. Embodiments of the disclosure address this issue by using a read-write lock. According to embodiments of the disclosure, the application code that acquires/releases the read lock before/after reading the content of p is automatically generated by the compiler and requires no application change.

Internal Fragmentation

Figure 1:
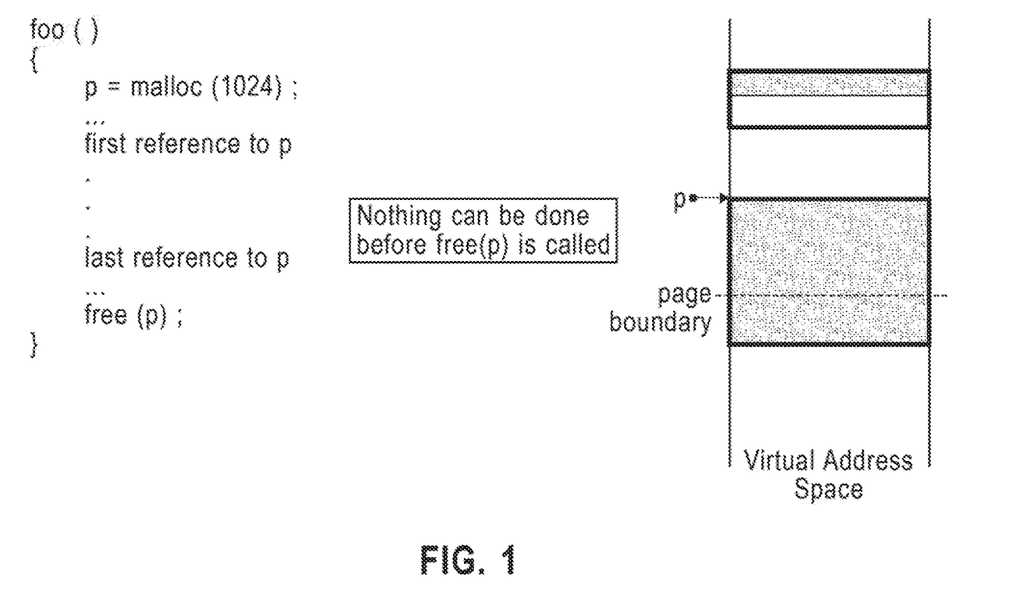
FIG. 1 illustrates current memory allocation, according to an embodiment of the disclosure.

A simple example can be used to illustrate how embodiments of the disclosure address the memory internal fragmentation situation. FIG. 1 illustrates how existing memory allocation works and the issues involved in addressing the situation. FIG. 1 shows a typical example of an application using malloc( )/free( ) calls to manage its memory, which includes the following steps:

1. Call malloc( ) with desired memory size and get back a pointer p to the memory chunk;
2. Use pointer p to access the content of the memory chunk;
3. Call free( ) with pointer p to release the memory chunk when done.

As indicated in the figure, the memory chunk given to the application can cross a page boundary. As a result, the application is using two pages. Even though the application might be using a small portion at the top of the $2^{nd}$ page, no other application can use the free space in the $2^{nd}$ page. If the memory chunk pointed by p could be moved "up" so that it falls completely inside the $1^{st}$ page, then the $2^{nd}$ page can be recycled for use by other applications. However, because the application is holding a direct pointer p to the memory chunk, there is nothing the memory allocator can do until the application calls free( ).

Transparent Move of Memory Chunk

Figure 2:
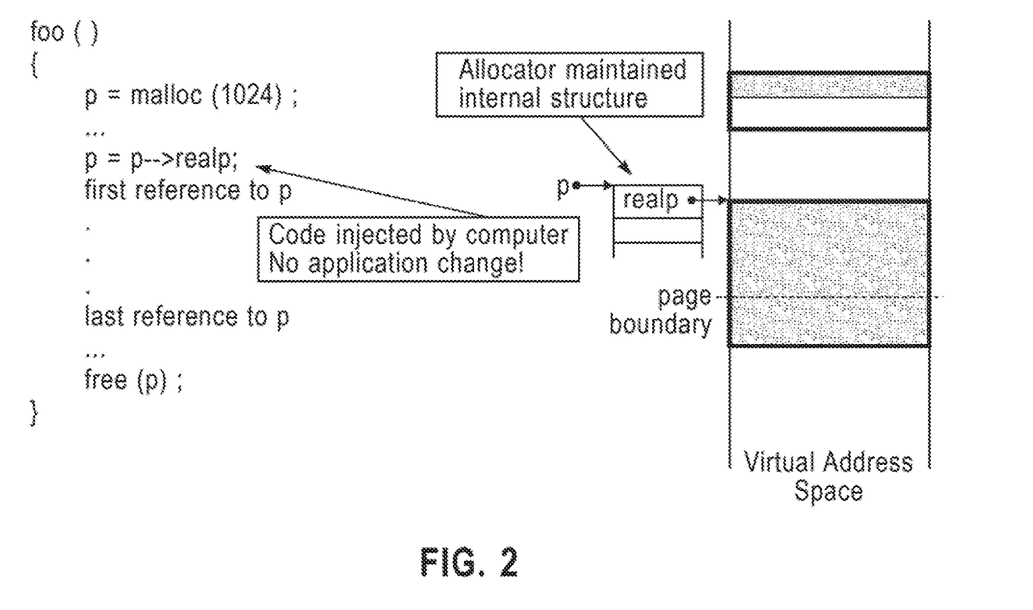
FIG. 2 illustrates indirect memory allocation, according to an embodiment of the disclosure.

As the first step of addressing the challenge of moving an in-use memory chunk, embodiments of the disclosure modify the memory allocator such that a direct pointer p to the memory chunk like that in FIG. 1 is not returned to the application. Instead, an indirect pointer that points to p is returned to the application. This is illustrated in FIG. 2.

As shown in the figure, the pointer p returned to the application does not directly point to the memory chunk. It points to realp, the original p in FIG. 1, that points to the memory chunk. Of course, to access the memory chunk, the correct code now must first dereference pointer p once to get realp before the first reference to p, as shown by the line p=p→realp in FIG. 2.

Figure 3:
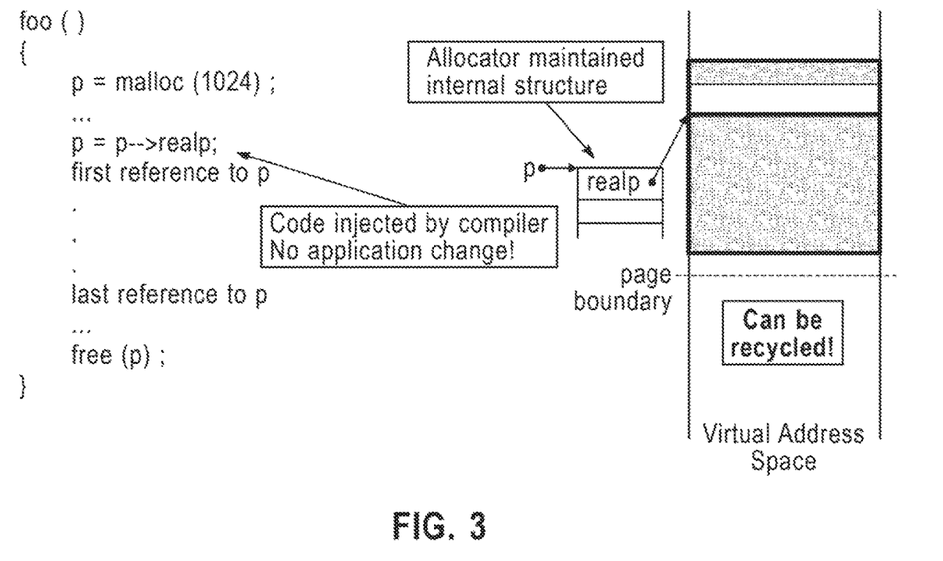
FIG. 3 illustrates a transparent move of a memory chunk, according to an embodiment of the disclosure.

It would be impractical to require all applications to be changed for this additional line of code. Embodiments of the disclosure address this situation by augmenting the compiler to track the pointer p returned by malloc( ) and to automatically insert the code p=p→realp without requiring any application change. With this indirection in place, the memory allocator can now move the memory chunk "up" into the $1^{st}$ page and recycle the $2^{nd}$ page, as shown in FIG. 3. The move is transparent to the application since it's pointer p never changes. The move is performed by modifying realp to the new location of the memory chunk.

Synchronizing Memory Chunk Access and Move

There is another issue when moving the in-use memory chunk. While the memory allocator is moving the chunk, the application could be actively accessing the chunk. So there is a race condition between the application and the memory allocator in terms of accessing realp. More specifically, the application needs to read the content of realp to access the chunk, while the memory allocator needs to modify the content of realp to move the chunk. In addition, there can be multiple application threads accessing the chunk. Thus, there should be concurrency control among the application threads and the memory allocator.

Figure 4:
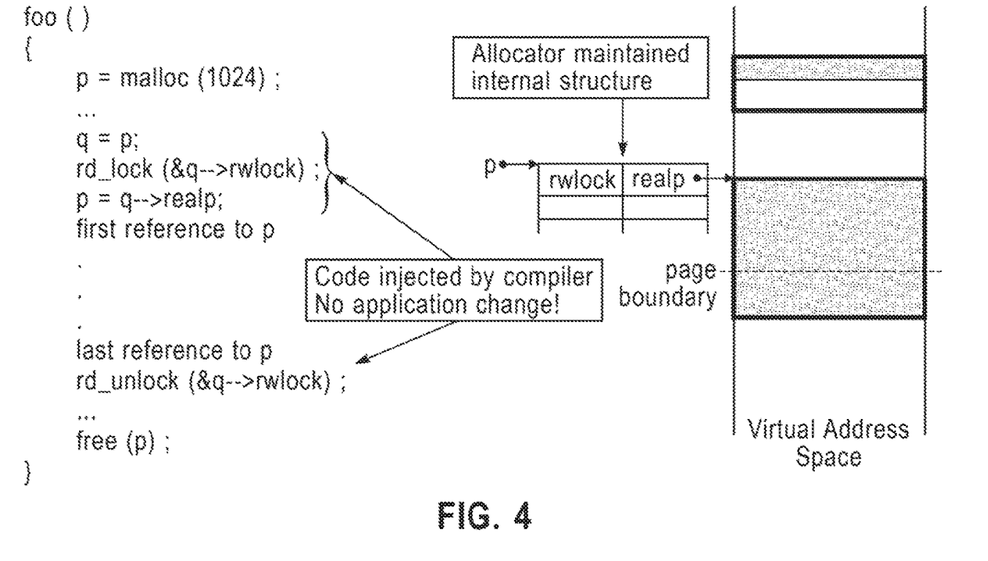
FIG. 4 illustrates indirect memory allocation with an application side read-write lock, according to an embodiment of the disclosure.

To address the challenge of moving an in-use memory chunk, embodiments of the disclosure use a simple read-write lock. The situation is a typical multiple readers single writer scenario. The application threads will only read the content of realp, while the memory allocator is the sole writer of realp. According to embodiments of the disclosure, the indirection mechanism in FIG. 2 is extended by associating with each realp a read-write lock rwlock, as shown in FIG. 4.

According to an embodiment, before dereferencing pointer p to get realp, the application acquires a read lock on rwlock. After the last reference to p, the application releases the read lock on rwlock. The additional code for performing the locking and releasing are indicated in FIG. 4. Once again, according to an embodiment, this code can be automatically generated by the compiler so no application change is required. This locking incurs little overhead to the application since all application threads are readers so they can proceed without blocking. The read lock on rwlock protects the application against the memory allocator from moving the chunk "underneath" it while the application is actively accessing the chunk.

Figure 5:
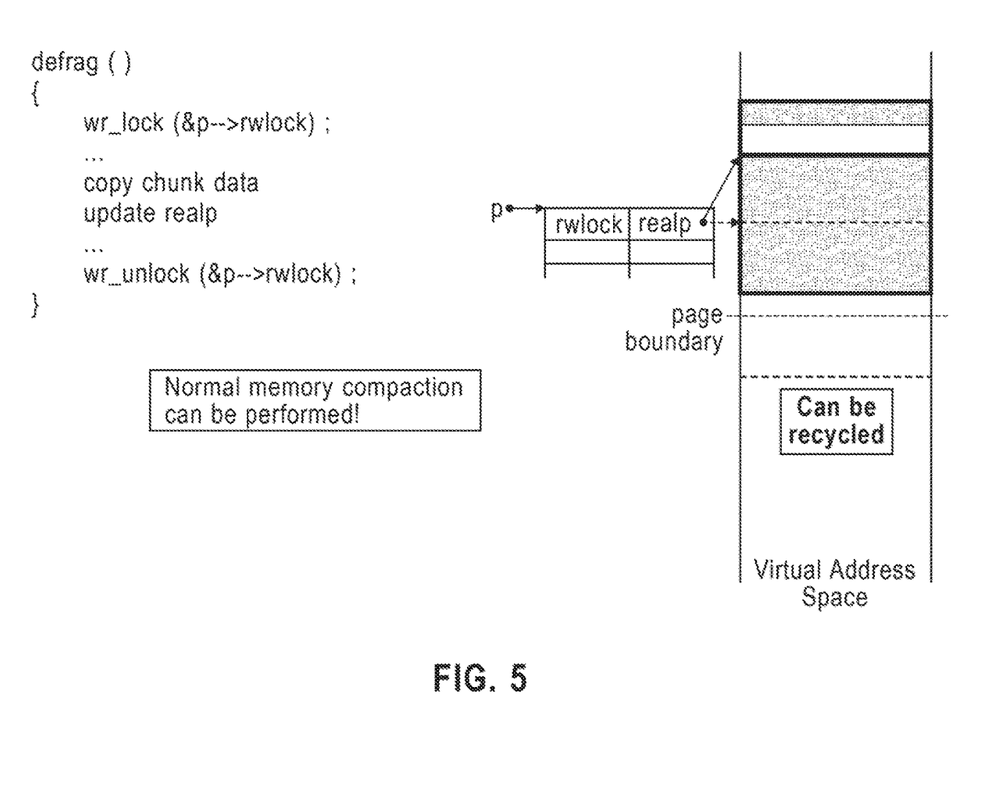
FIG. 5 illustrates indirect memory allocation with an allocator side read-write lock, according to an embodiment of the disclosure.

According to an embodiment of the disclosure, on the memory allocator side, before it can move an in-use memory chunk, it must first acquire a write lock on rwlock. The write lock on rwlock protects the memory allocator against any application thread from accessing the chunk while the memory allocator is moving the chunk. A defragmentation logic defrag( ) according to an embodiment of the memory allocator is shown in FIG. 5, where the added code is the acquisition and release of the write lock.

Figure 6:
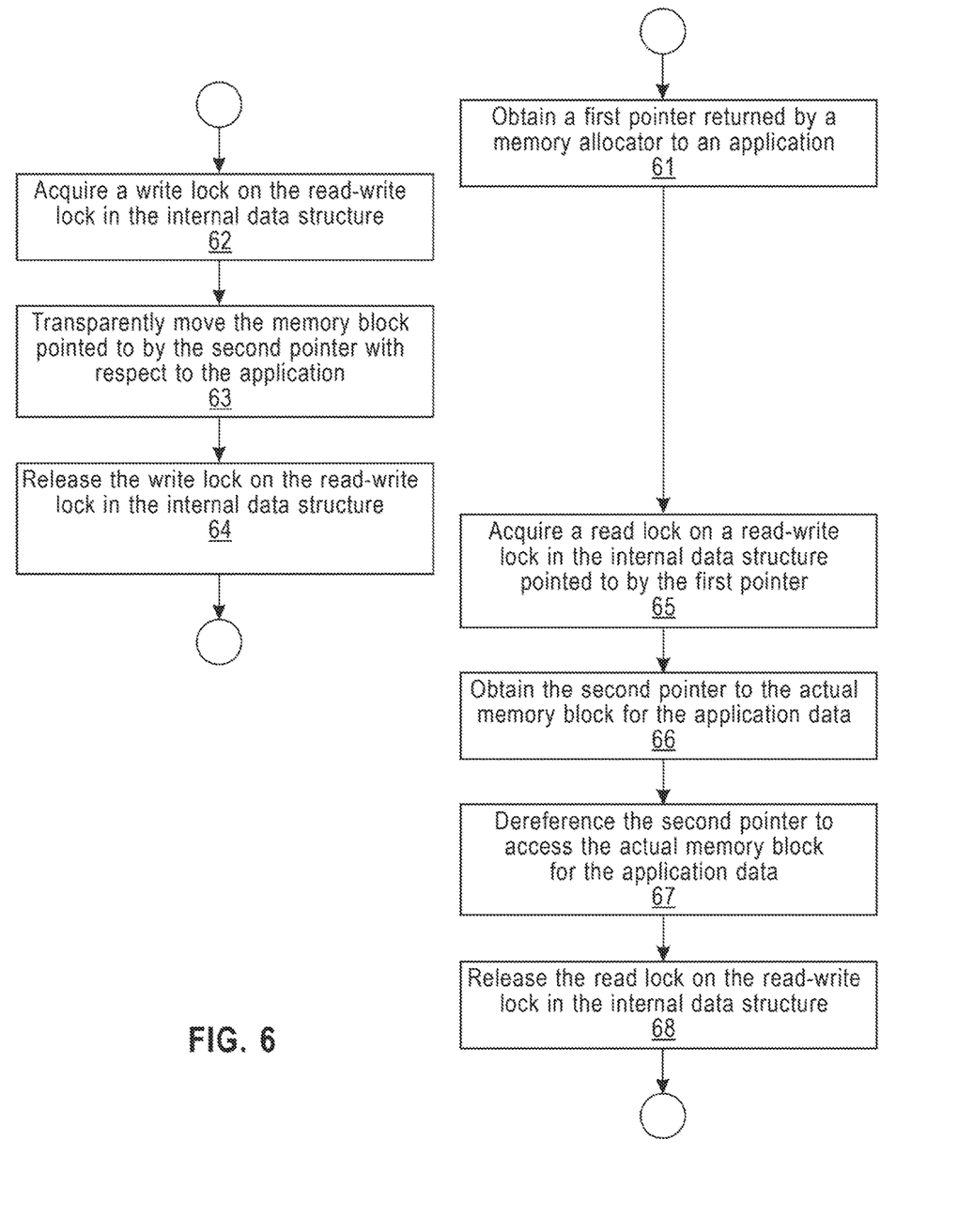
FIG. 6 presents flow charts of methods of transparently moving a block of memory with respect to an application using the block of memory, according to an embodiment of the disclosure.

FIG. 6 presents flow charts of a method of transparently moving a block of memory with respect to an application using the block of memory, according to an embodiment of the disclosure. An embodiment includes two method flows: an application flow and a memory allocator flow. Assuming that the compiler has inserted the appropriate computer code in an application that includes a memory allocation call, the application instructions encoded by the inserted computer code begin at step 61 by obtaining a first pointer returned by a memory allocator to an application. The first pointer points to an internal data structure, where the internal data structure includes a read-write lock and a second pointer, and the second pointer points to an actual memory block for the application data. At step 62, the memory allocator acquires a write lock on the read-write lock in the internal data structure. The memory block pointed to by the second pointer is transparently moved with respect to the application at step 63 by the memory allocator, and at step 64, the memory allocator releases the write lock on the read-write lock in the internal data structure. At step 65, before the first pointer is used by the application, a read lock is acquired on a read-write lock in the internal data structure pointed to by the first pointer. The method continues at step 66 by obtaining the second pointer to the actual memory block for the application data. At step 67, the second pointer to access the actual memory block for the application data is dereferenced. At step 68, after a last use of the first pointer by the application, the application instructions encoded by the inserted computer code release the read lock on the read-write lock in the internal data structure. Note that steps 62 to 65, performed by the memory allocator, can also be performed after application step 68 in which the read lock is released.

A memory allocator flow (steps 62-64) according to an embodiment can only move a memory block transparently when the application flow (steps 61, 65-68) does not hold a read lock. Once the application flow holds the read lock, a memory allocator flow's attempt to acquire a write lock will fail and it has to wait until the application flow releases the read lock. In other words, the memory allocator flow can acquire a write lock and proceed either before application flow step 65, or after application flow step 68, but not in between. This is by design because the memory allocator cannot move the memory block while the application is actively using it.

Similarly, according to an embodiment, once the memory allocator holds the write lock and starts to move the memory block, the application flow's attempt to acquire a read lock will fail and it has to wait until the memory allocator flow releases the write lock. In other words, the application flow can acquire a read lock and proceed either before memory allocator flow box 62, or after memory allocator flow box 64, but not in between. This is also by design because the application cannot use the memory block until the memory allocator has finished moving it.

Reducing Memory Fragmentation

A memory allocator supports relocation if it allows memory blocks which are being used by at least one application to be moved to another part of memory while allowing the application to continue executing correctly. Embodiments of the disclosure can provide a memory allocator that supports relocation which results in better performance than other memory allocators that support relocation. Hereinbelow, a memory allocator according to an embodiment that supports relocation will be referred to as a relocation memory allocator, and a memory allocator that does not support relocation will be referred to as a non-relocation memory allocator.

A scenario in which relocation memory allocators can be used is to reduce memory fragmentation. One technique for reducing memory fragmentation is to copy some or all memory blocks in use to a contiguous area of memory at one end of the address space. A technique for reducing memory fragmentation within a page is to copy some or all memory blocks on the page which are in use to a contiguous area of memory at one end of the page. This process of moving allocated blocks so that they are adjacent to each other in a contiguous area of memory is known as memory compaction.

Compacting memory consumes CPU cycles. Therefore, there is a cost to performing memory compaction. Memory compaction can be deferred until a system is running low on memory. For example, if a system cannot satisfy a memory request, then memory compaction can be performed. Systems according to embodiments of the disclosure can perform memory compaction pre-emptively before the system runs out of memory. A system according to an embodiment periodically monitors CPU usage and maintains statistics on memory usage, such as the total amount of memory in use, the total amount of memory needed by the application(s), which may be less than the total amount of memory in use due to internal fragmentation, and the largest free block size. When the total amount of memory in use $m1$ exceeds a threshold $t1$, this indicates that the system may soon run out of memory, suggesting that a compaction could be beneficial. When the largest free block size $f1$ falls below a threshold $t2$, this indicates that the system may soon encounter a memory request that it cannot satisfy, suggesting that a compaction could be beneficial. When the difference $d1$ between the total amount of memory in use $m1$ and the total amount of memory needed by the application(s) exceeds a threshold $t3$, this indicates that a considerable amount of memory might be reclaimed by memory compaction, suggesting that a compaction could be beneficial. A system according to an embodiment also keeps track of the average CPU usage $c1$ over the past $s1$ seconds. When average CPU usage falls below a threshold $t4$, this suggests that the system has the CPU resources to devote to memory compaction.

Relocation memory allocators can incur overhead compared with conventional non-relocation memory allocators. For example, locking overhead may be incurred, as well as overhead for following more pointers due to an extra level of indirection. Therefore, such allocators should only be used if memory usage is high. Embodiments of the disclosure can provide the ability to tailor the amount of memory managed using a relocation memory allocator based on memory usage. When memory usage is high, a relocation memory allocator is used more frequently. When memory usage is low, a relocation memory allocator is used less frequently.

In virtual memory systems in which paging is used when memory overflows, a memory relocation system that supports paging can be used to improve paging behavior. For example, when main memory is not large enough to store all data used by an application(s) in main memory, some pages will be sent to disk, in particular, pages that contain less frequently accessed information. A system according to an embodiment can relocate memory blocks so that blocks with similar access frequencies are placed on the same set of pages. A system according to an embodiment also maintains data on access frequencies of different memory blocks. The least frequently accessed blocks can be placed on the same set of pages. Pages that contain these least frequently accessed blocks are good candidates for paging to disk when memory overflows. Similarly, the most frequently accessed blocks can be placed on the same set of pages. These pages would be frequently accessed and would not be paged to disk. If the access frequency of a block changes over time, the block can be moved to a new page based on its new access frequency.

Blocks of memory often have temporal access patterns in which a certain set of blocks have a high probability of being accessed within the same time period. A system according to an embodiment thus has the ability to place blocks accessed within close temporal proximity to each other on the same page. A system according to an embodiment can maintain data on latest access times of different memory blocks, and can then run one or more clustering algorithms to determine memory blocks with similar access times. These clustering algorithms include, but are not limited to, k-means clustering, hierarchical clustering, DBSCAN, Gaussian mixtures, mean-shift clustering, or others. The clustering algorithms can indicate which memory blocks are accessed in close temporal proximity to one another. According to an embodiment, blocks which are accessed in close temporal proximity to one another based on one or more clustering algorithms are stored on the same page.

Figure 7:
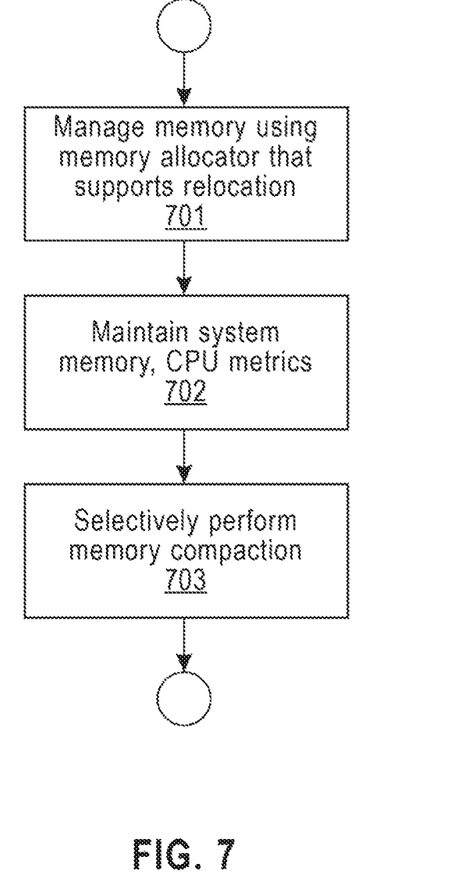
FIG. 7 depicts a method for selectively performing memory compaction, according to embodiments of the disclosure.

FIG. 7 depicts a method for selectively performing memory compaction according to embodiments of the disclosure. It should be noted that steps 701 and 702 in FIG. 7 are being continuously performed. In step 701, memory is being managed using a relocation memory allocator. An exemplary relocation memory allocator according to an embodiment was described above. Other relocation memory allocators can also be used in step 701 within the spirit and scope of embodiments of the disclosure. In step 702, the system is constantly collecting system metrics, including, but not limited to, the total amount of memory in use $m1$, the largest free block size $f1$, the difference $d1$ between the total amount of memory in use and the total amount of memory needed by the application(s), and the average CPU usage $c1$ over the past $s1$ seconds.

In step 703, according to an embodiment, the system performs memory compaction based on system metrics determined in step 702. For example, when the average CPU usage $c1$ over the past $s1$ seconds falls below a threshold $t4$, this can cause memory compaction to occur. As another example, when the total amount of memory in use $m1$ exceeds a threshold $t1$, this can cause memory compaction to occur. As another example, when the largest free block size $f1$ falls below a threshold $t2$, this can cause memory compaction to occur. As yet another example, when the difference $d1$ between the total amount of memory in use and the total amount of memory needed by the application(s) exceeds a threshold $t3$, this can cause memory compaction to occur.

In step 703, according to an embodiment, during memory compaction, it is possible to move memory blocks which are currently being used by one or more applications without affecting the correctness of the one or more applications, by using a relocation memory allocator according to an embodiment (step 701).

Other methods for determining when to perform compaction in step 703 consider multiple parameters of the set $m1$, $f1$, $d1$, or $c1$.

Figure 8:
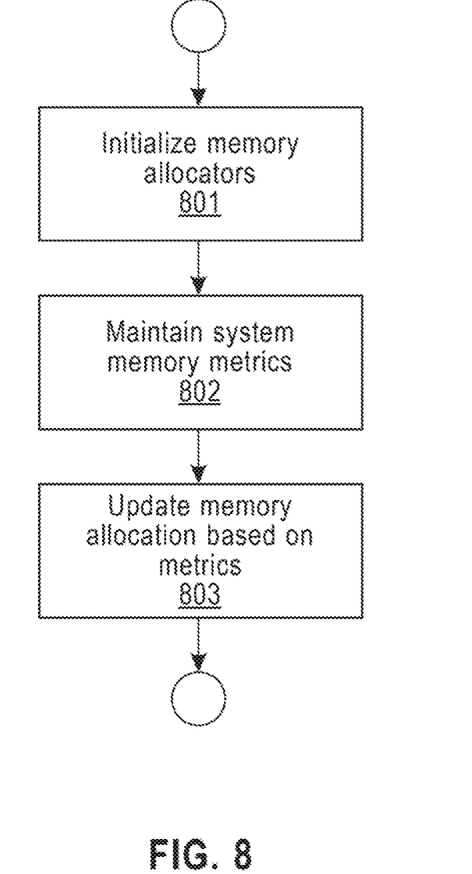
FIG. 8 depicts a method for determining how frequently to use a memory allocator that supports relocation, according to embodiments of the disclosure.

FIG. 8 depicts a method for determining how frequently to use a relocation memory allocator, according to embodiments of the disclosure. In step 801, a system is initialized to use a relocation memory allocator for a certain fraction $fr1$ of memory blocks and a conventional non-relocation memory allocator for the remaining requests. Fraction $fr1$ can either be a default parameter or determined from the expected workload. If the expected workload at the beginning of the computation is not expected to require too much memory, then $fr1$ can be smaller.

In step 802, according to an embodiment, the system is constantly collecting system metrics, including, but not limited to, the total amount of memory in use m1, the largest free block size f1, and the difference d1 between the total amount of memory in use and the total amount of memory needed by the application(s).

In step 803, according to an embodiment, the system can modify the fraction fr1 of memory blocks allocated by a relocation memory allocator based on system metrics determined in step 802. For example, when the total amount of memory in use m1 increases, the system can increase fr1. As another example, when the total amount of memory in use m1 decreases, the system can decrease fr1. Memory blocks not allocated by a relocation memory allocator are allocated by a conventional non-relocation memory allocator, which has a lower overhead than a relocation memory allocator.

As another example, according to an embodiment, when the largest free block size f1 decreases, the system can increase fr1. As another example, when f1 increases, the system can decrease fr1. As yet another example, when the difference d1 between the total amount of memory in use and the total amount of memory needed by the application(s) increases, the system can increase fr1. As another example, when d1 decreases, the system can decrease fr1.

According to an embodiment, when fr1 changes in step 803, the system can leave memory blocks which are already in use alone and simply use the new value of fr1 for future memory block allocations. Alternatively, the system can change some allocated blocks managed by a relocation memory allocator to be managed by a non-relocation memory allocator in response to a decrease in fr1, and change some allocated blocks managed by a non-relocation memory allocator to be managed by a relocation memory allocator in response to an increase in fr1.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud, the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
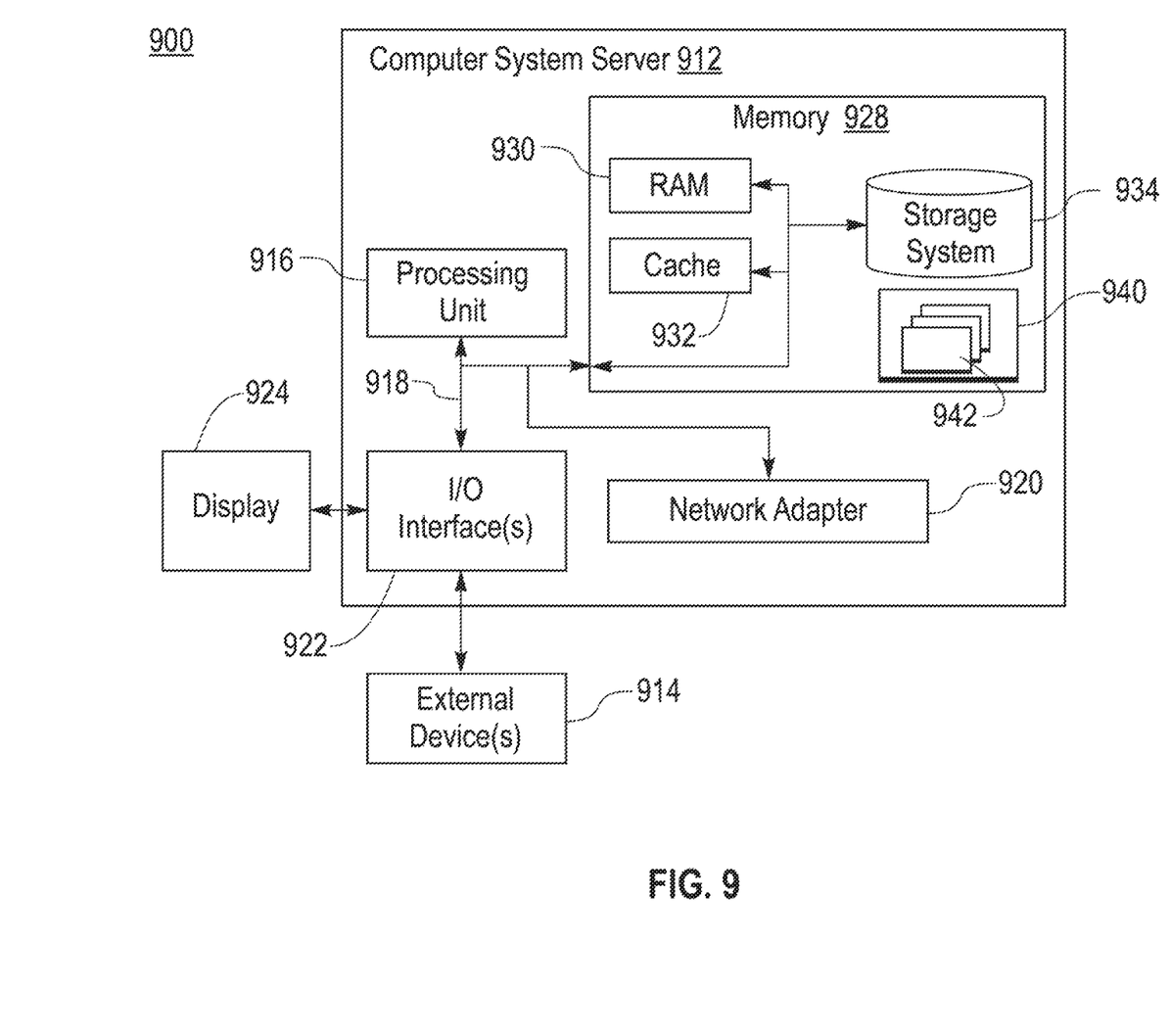
FIG. 9 is a schematic of an exemplary cloud computing node that implements an embodiment of the disclosure.

Referring now to FIG. 9, a schematic of an example of a cloud computing node is shown. Cloud computing node 910 is only one example of a suitable cloud computing node and is not intended to suggest any limitation as to the scope of use or functionality of embodiments of the disclosure described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PC's, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the disclosure as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
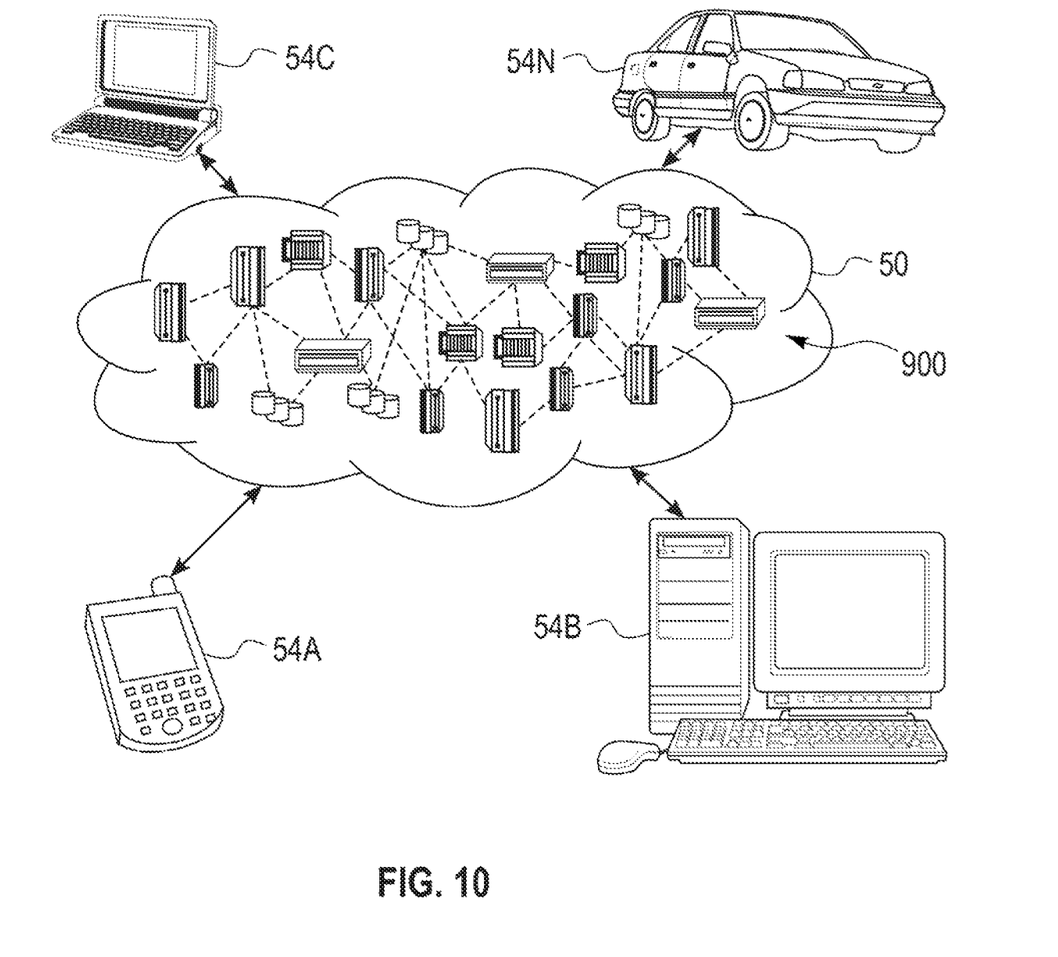
FIG. 10 shows an exemplary cloud computing environment according to embodiments of the disclosure.

Referring now to FIG. 10, illustrative cloud computing environment 50 is depicted. As shown, cloud computing environment 50 comprises one or more cloud computing nodes 900 with which local computing devices used by cloud consumers, such as, for example, personal digital assistant (PDA) or cellular telephone 54A, desktop computer 54B, laptop computer 54C, and or automobile computer system 54N may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for compiling an application to allow data in a block of memory being used by the application to be transparently moved with respect to the application, comprising the steps of:
    inserting, by a compiler, into an application that includes a call to a memory allocator, computer code that includes instructions for the steps of:
        obtaining a first pointer to an internal data structure, wherein the internal data structure includes a read-write lock and a second pointer returned by the memory allocator, wherein the second pointer points to a first actual memory block for the application;
        before the first pointer is used by the application, acquiring a read lock on a read-write lock in the internal data structure pointed to by the first pointer;
        obtaining the second pointer to the first actual memory block for the application data; and
        dereferencing the second pointer to access the first actual memory block for the application data,
        wherein data in the first actual memory block is configured to be moved by the memory allocator without changing the value of the first pointer.

2. The method of claim 1, further comprising, when the application includes a memory free call,
    inserting, by the compiler, into the application, computer code that includes instructions for, after a last use of the first pointer by the application,
    releasing the read lock on the read-write lock in the internal data structure.

3. The method of claim 2, wherein the instructions that release the read lock are inserted between a last reference to the first pointer and the memory free call.

4. The method of claim 1, wherein the read lock on the read-write lock prevents the memory allocator from moving the memory block while the memory block is being accessed through the second pointer.

5. The method of claim 1, further comprising:
    transparently moving, by the memory allocator, data in the first actual memory block to a second actual memory block; and
    updating the second pointer to point to the second actual memory block.

6. The method of claim 1, further comprising
    inserting in a memory allocator function that defragments memory, computer code that includes instructions for acquiring a write lock on the read-write lock associated with the memory block pointed to by the second pointer, and
    releasing said write lock after moving said memory block, wherein the acquiring instruction is inserted before an instruction that moves the memory block, and the releasing instruction is inserted after the instruction that moves the memory block.

7. The method of claim 1, wherein the instructions for obtaining a first pointer, acquiring a read lock, obtaining a second pointer, and dereferencing the second pointer are inserted between the memory allocation call and a first reference to the first pointer.

8. A method for reducing fragmentation in memory pages, comprising the steps of:
    obtaining a first pointer returned by a memory allocator to an application, wherein the first pointer points to an internal data structure, wherein the internal data structure includes a read-write lock and a second pointer returned by the memory allocator, wherein the second pointer points to an actual memory block for the application;
    before the first pointer is used by the application, acquiring a read lock on a read-write lock in the internal data structure pointed to by the first pointer;
    obtaining the second pointer to the actual memory block for the application data; and
    dereferencing the second pointer to access the actual memory block for the application data,
    wherein data in the actual memory block is configured to be moved by the memory allocator without changing the value of the first pointer.

9. A method for selectively performing memory compaction in a computer, comprising the steps of:
    allocating a plurality of memory blocks using a memory allocator that supports relocation;
    periodically monitoring the computer wherein a metric correlated with CPU or memory usage is determined; and
    performing a memory compaction based on comparing the metric with a first threshold by moving a memory block being used by at least one application.

10. The method of claim 9,
    wherein the metric comprises an average CPU usage over a time period, and
    wherein performing a memory compaction based on comparing the metric with a first threshold comprises performing a memory compaction if the metric falls below the first threshold.

11. The method of claim 9,
    wherein the metric comprises one of a total amount of memory in use or a difference between a total amount of memory in use and a total amount of memory needed by at least one application, and
    wherein performing a memory compaction based on comparing the metric with a first threshold comprises performing a memory compaction if the metric exceeds the first threshold.

12. The method of claim 9,
    wherein the metric comprises a largest free block size, and
    wherein performing a memory compaction based on comparing the metric with a first threshold comprises performing a memory compaction if the metric falls below the first threshold.

13. The method of claim 9, wherein performing a memory compaction comprises copying a plurality memory blocks to a contiguous area of memory at one end of an address space.

14. The method of claim 9, wherein performing a memory compaction comprises copying a plurality memory blocks to a contiguous area of memory at one end of a page.

15. The method of claim 9,
    wherein the memory allocator that supports relocation returns a first pointer to an internal data structure, wherein the internal data structure contains a read-write lock and a second pointer returned by the memory allocator, and the second pointer points to an actual memory block for an application, wherein data in the actual memory block is configured to be moved by the memory allocator without changing the value of the first pointer.

16. A method for allocating memory blocks in a computer, comprising the steps of:

providing a first memory allocator that supports relocation and a second memory allocator that does not support relocation;

determining a fraction of memory blocks to be allocated using the first memory allocator;

periodically monitoring the computer wherein a metric correlated with memory usage is determined; and modifying the fraction of memory blocks to be allocated using the first memory allocator based on a value of the metric, wherein the first memory allocator that supports relocation is configured to move a memory block being used by at least one application.

17. The method of claim 16 further comprising allocating memory blocks using the first or second memory allocators.

18. The method of claim 17, further comprising at least one of:

associating a memory block previously managed by the first memory allocator with the second memory allocator in response to a decrease in the fraction of memory blocks to be allocated using the first memory allocator; or associating a memory block previously managed by the second memory allocator with the first memory allocator in response to an increase in the fraction of memory blocks to be allocated using the first memory allocator.

19. The method of claim 16, wherein the fraction of memory blocks to be allocated using the first memory allocator is initialized to a default value.

20. The method of claim 16, wherein the fraction of memory blocks to be allocated using the first memory allocator is initialized based on an expected workload at a beginning of a computation.

21. The method of claim 16, wherein the metric comprises one of a total amount of memory in use or a difference between a total amount of memory in use and a total amount of memory needed by at least one application, and wherein modifying the fraction of memory blocks to be allocated using the first memory allocator comprises at least one of:

increasing the fraction of memory blocks to be allocated using the first memory allocator in response to an increase of the metric; or decreasing the fraction of memory blocks to be allocated using the first memory allocator in response to a decrease of the metric.

22. The method of claim 16, wherein the metric comprises a largest free block size, and wherein modifying the fraction of memory blocks to be allocated using the first memory allocator comprises at least one of:

increasing the fraction of memory blocks to be allocated using the first memory allocator in response to a decrease of the metric; or decreasing the fraction of memory blocks to be allocated using the first memory allocator in response to an increase of the metric.

23. The method of claim 16, further comprising moving a first block to a same page as a second block based on an access frequency of the first block and an access frequency of the second block.

24. The method of claim 16 further comprising moving a first block to a same page as a second block based on an access time of the first block and an access time of the second block.

25. A non-transitory program storage device readable by a computer, tangibly embodying a program of instructions executed by the computer to perform the method steps for compiling an application to allow for data in a block of memory being used by the application to be transparently moved with respect to the application, comprising the steps of:

inserting, by a compiler, into an application that includes a call to a memory allocator, computer code that includes instructions for the steps of:

obtaining a first pointer to an internal data structure, wherein the internal data structure includes a read-write lock and a second pointer returned by the memory allocator, wherein the second pointer points to a first actual memory block for the application;

before the first pointer is used by the application, acquiring a read lock on a read-write lock in the internal data structure pointed to by the first pointer;

obtaining the second pointer to the first actual memory block for the application data; and dereferencing the second pointer to access the first actual memory block for the application data, wherein data in the actual memory block is configured to be moved by the memory allocator without changing the value of the first pointer.

* * * * *